(12) United States Patent
DeLuca et al.

(10) Patent No.: US 10,432,634 B2
(45) Date of Patent: Oct. 1, 2019

(54) GATING OF FULL NETWORK ACCESS PENDING DELIVERY OF NOTIFICATION INFORMATION

(71) Applicant: International Business Machines Corporation, Armonk, NY (US)

(72) Inventors: Lisa Seacat DeLuca, San Francisco, CA (US); Dana Price, Surf City, NC (US); Aaron James Quirk, Raleigh, NC (US); Shelbee Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 15/862,420

(22) Filed: Jan. 4, 2018

(65) Prior Publication Data
US 2019/0207941 A1    Jul. 4, 2019

(51) Int. Cl.
*G06F 15/16* (2006.01)
*H04L 29/06* (2006.01)
(Continued)

(52) U.S. Cl.
CPC ............ *H04L 63/10* (2013.01); *H04H 20/93* (2013.01); *H04L 29/06* (2013.01); *H04L 29/08072* (2013.01)

(58) Field of Classification Search
CPC ... H04L 29/08072; H04L 29/06; H04L 67/10; H04L 63/20
(Continued)

(56) References Cited

U.S. PATENT DOCUMENTS

| 8,572,676 | B2 * | 10/2013 | Sapp | ............... H04L 41/0806 726/1 |
| 8,955,038 | B2 * | 2/2015 | Nicodemus | ......... G06F 11/3495 726/1 |

(Continued)

OTHER PUBLICATIONS

National Institute of Standards and Technology; The NIST Definition of Cloud Computing; Special Publication 800-145; Dec. 13, 2016; pp. M-7 to M-13.

*Primary Examiner* — Khanh Q Dinh
(74) *Attorney, Agent, or Firm* — Garlick & Markison; Timothy W. Markison; Harry S. Tyson, Jr.

(57) ABSTRACT

Methods and systems for use in constraining access to network resources based on notification and compliance requirements. In various examples, an access point or similar device receives and stores notification information (e.g., from a network administrator device) for provision to targeted client devices in a notification message. The access point also receives target criteria for use in identifying target client devices that are accessing or attempting to access network resources via the access point. In some embodiments, access to network resources by a targeted client device is constrained pending completion of a compliance condition requirement associated with a notification message. Various levels of access to network resources may be applied to non-compliant target client devices. Following completion of compliance condition, a target client device is exempted from further receipt of the notification message. Select client devices otherwise meeting the target criteria may also be excluded from receiving a notification message.

20 Claims, 8 Drawing Sheets

(51) Int. Cl.
*H04H 20/93* (2008.01)
*H04L 29/08* (2006.01)

(58) Field of Classification Search
USPC ............... 709/203, 220, 224, 226, 228, 232
See application file for complete search history.

(56) References Cited

U.S. PATENT DOCUMENTS

| | | | |
|---|---|---|---|
| 9,288,199 | B1 | 3/2016 | Winn et al. |
| 9,369,299 | B2 | 6/2016 | Dupont et al. |
| 9,608,997 | B2* | 3/2017 | Nicodemus ......... G06F 11/3495 |
| 9,923,918 | B2* | 3/2018 | Nicodemus ......... G06F 11/3495 |
| 10,089,482 | B2* | 10/2018 | Skipper ............... G06F 21/6209 |
| 2003/0088640 | A1 | 5/2003 | Rasheed et al. |
| 2009/0234721 | A1 | 9/2009 | Bigelow et al. |
| 2010/0115582 | A1* | 5/2010 | Sapp ................... H04L 41/0806 726/1 |
| 2013/0254833 | A1* | 9/2013 | Nicodemus ......... G06F 11/3495 726/1 |
| 2015/0341965 | A1* | 11/2015 | Spencer ............... H04W 12/06 370/338 |
| 2017/0200018 | A1 | 7/2017 | Boncha et al. |

\* cited by examiner

GATING OF FULL NETWORK ACCESS PENDING DELIVERY OF NOTIFICATION INFORMATION

BACKGROUND

This invention relates generally to computer networks, and more specifically, to constraining access to a network based on a notification requirement.

Various approaches are used to provide security in networking environments. For example, network access control (NAC) technologies are often employed by corporations, universities and other large entities for purposes enforcing security policies, protecting network resources and meeting regulatory standards. In general, a NAC server operates in conjunction with network infrastructure to perform user authentication based on login credentials (e.g., username and password), and may further enforce post authentication policies that limit access to network resources based on endpoint device configurations, installed anti-threat applications, user authorizations, etc. To gather information for making access control decisions, a NAC system may require that agent software be installed on endpoint devices for reporting device characteristics. Certain operating systems incorporate such software. Alternatively, scanning and network inventory techniques are sometimes utilized to remotely gather system characteristics. Automated remediation policies can also be implemented, such as pushing software patches and upgrades to connected devices.

SUMMARY

Embodiments of the present invention disclose a computer-implemented method, a system, and a computer program product for gating access to network resources pending delivery of stored notification information and fulfilment of compliance criteria. Notification information is received and stored for provisioning, via a notification message, to one or more target client devices accessing or attempting to access network resources. Target criteria for use in identifying target client devices is also received, as well as compliance information relating to the notification information. A compliance condition based on the compliance information is established and associated with the notification message. In addition, network resource access level information, relating to the compliance condition, is also received and stored. The network resource access level information specifies a permitted (e.g., constrained) network resource access level applicable to non-compliance with the compliance condition. Based on the target criteria, a target client device is identified and a notification message, including the stored notification information, is transmitted for receipt by the target client device.

DETAILED DESCRIPTION

According to an embodiment of the present invention, novel notification messaging and compliance-based access management involves receiving and storing (e.g., by an access point) notification information for provisioning, via a notification message, to one or more target client devices accessing or attempting to access network resources. This novel notification messaging also involves receiving target criteria for use in identifying target client devices, and compliance information relating to the notification information. Based on the compliance information, this novel notification and compliance-based access management establishes a compliance condition that is associated with the notification message. In addition, network resource access level information, relating to the compliance condition, is also received. The network resource access level information specifies a permitted (e.g., constrained) network resource access level applicable to non-compliance with the compliance condition. Based on the target criteria, this novel notification messaging and compliance-based access management identifies a target client device and transmits a notification message, including the stored notification information, for receipt by the target client device.

Figure 1:
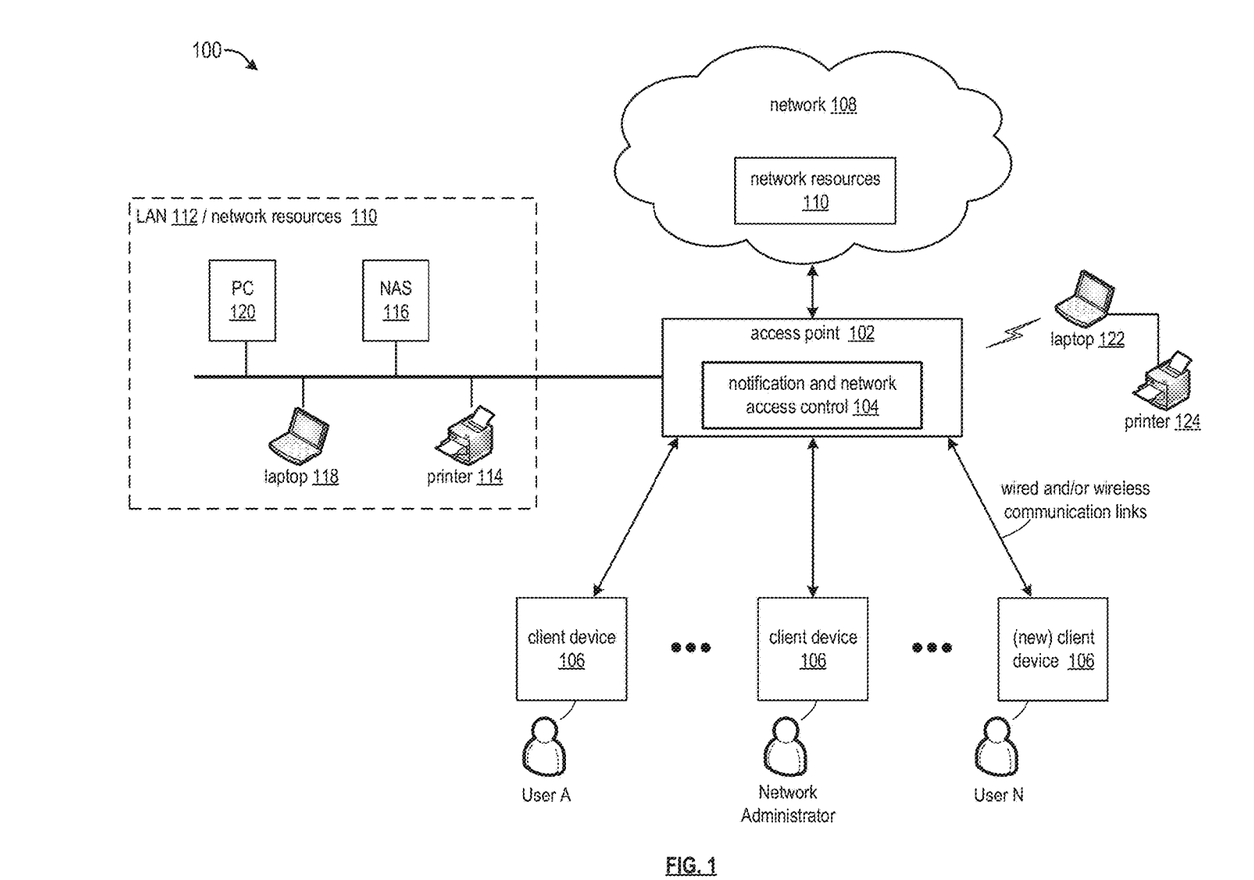
FIG. 1 is a schematic block diagram of an example of a network environment including notification messaging capabilities in accordance with an embodiment of the present disclosure.

FIG. 1 is a schematic block diagram of an example of a network environment 100 including notification messaging capabilities in accordance with an embodiment of the present disclosure. The illustrated network includes an access point 102, having notification and network access control 104 functionality, and a plurality of client devices 106 associated with a plurality of users including a User A-N and a network administrator. The access point 102 and client devices 106 can be coupled to a network 108, which may include one or more wired and/or wireless communication links; one or more non-public intranet systems and/or public internet systems; and/or one or more local area networks (LAN) and/or wide area networks (WAN). In the illustrated example, access to network resources 110 by the client devices 106 is fully or partially controlled by the access point 102 in conjunction with notification and network access control 104.

The access point 102, an example of which is described more fully below in conjunction with FIG. 4, may include one or more of wired/wireless communication interfaces, a router, a switch, bridging functionality, a web server, network management application software, a firewall, a DHCP server, a broadband modem, etc. Further, it should be understood that aspects of the novel notification messaging and compliance-based access management methods and systems described herein may be incorporated in devices such as Wi-Fi hotspots, ethernet or cellular routers, femtocells, microcells, etc.

The various messaging and compliance-based access controls described in conjunction with the access point 102 may be distributed between multiple such access points (e.g., when bridged communication links are utilized) and/or other devices providing access to network resources. In some embodiments, network 108 can be implemented by utilizing the cloud computing environment 50 of FIG. 7, and the notification and network access control 104 can be implemented, for example, by utilizing network and access control processing 96 of the workloads layer 90 of FIG. 8 to perform notification messaging and access control. These and other illustrated components of network environment 100 can be implemented by utilizing one or more nodes 10 of a cloud computing environment 50 of FIG. 7. In an example, a network administrator may manage the access point 102 using a centralized or cloud server configured with access point management software.

In accordance with various embodiments of the invention, client devices 106 may each be a portable computing device or a fixed computing device. For example, a portable computing device may be a social networking device, a gaming device, a cell phone, a smart phone, a digital assistant, a laptop computer, a handheld computer, a tablet device, and/or any other portable device that includes a computing core and notification display capabilities. In other examples, a fixed computing device may be a computer (e.g., computing device 600 of FIG. 6), a computer server, a cable set-top box, a satellite receiver, a television set, a video game console, and/or any type of home or office computing equipment with integrated or attached notification display capabilities.

In accordance with an embodiment of the invention, each client device 106 includes software and hardware to support one or more communication links via the network 108 indirectly and/or directly. For example, a client device 106 can include an interface that supports a communication link (e.g., wired, wireless, direct, via a LAN, via the network 108, etc.) with the access point 102. As another example, a client device 106 interface can support communication links (e.g., a wired connection, a wireless connection, a LAN connection, and/or any other type of connection to/from the network 108) with one or more systems that include and/or host network resources 110.

Network resources 110 of network 108 can include, for example and without limitation, broadband access to an internet service provider, databases, printers, services, network attached storage (NAS), collaborative platforms, distributed computing resources, etc. Further, network resources 110 can include devices and services of a local area network (LAN) 112 including a printer 114, NAS 116, laptop 118, PC 120, and printer 124 (via a network client laptop 122).

As described more fully below, a network administrator can configure the access point 102 with persistently stored notification information, target criteria and exception information for identifying target client devices for receiving notification messages, and compliance information that may be utilized to restrict access to network resources 100. In this manner, a network administrator can have confidence that client devices will receive notification information, even if the network administrator does not know the target set of client devices in advance or have contact details for users associated with the client devices. Further, network users will receive notifications across all applicable devices (e.g., laptop computers, desktop computers, tablet devices, smart phones, etc.), regardless of frequency of use.

Figure 2:
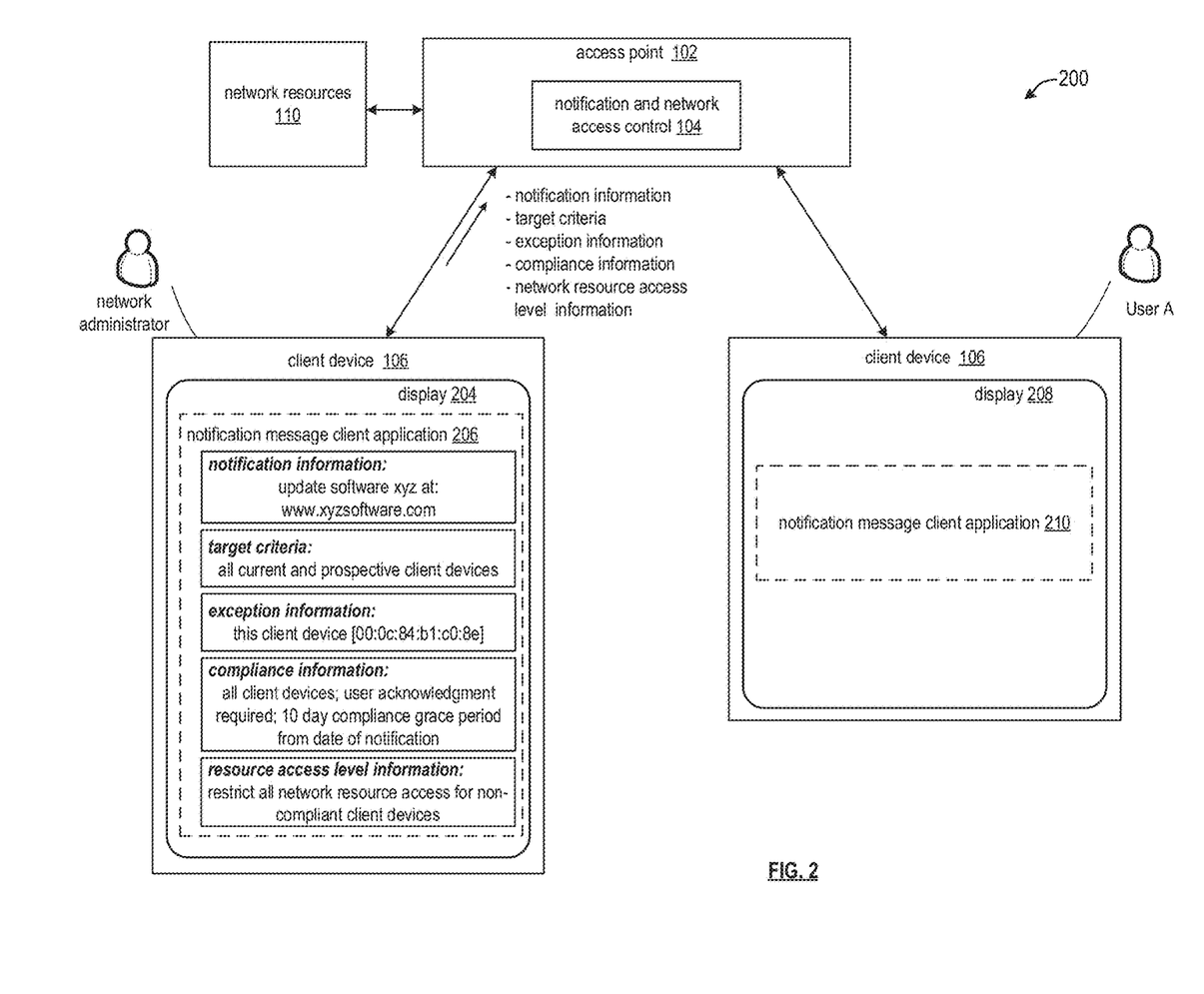
FIG. 2 is a schematic block diagram of an example of configuring notification messaging in accordance with an embodiment of the present disclosure.

FIG. 2 is a schematic block diagram of an example 200 of configuring notification messaging in accordance with an embodiment of the present disclosure. The illustrated example includes the access point 102, notification and network access control 104, client devices 106 associated with a network administrator and User A, and network resources of FIG. 1. The example client device 106 of a network administrator (or other authorized/credentialed user) includes a display 204 and the client device 106 of User A includes a display 208. The displays 204 and 206 can be integral with or otherwise associated with a respective client device 106, and can be implemented, for example, by utilizing the display screen 620 of FIG. 6. A user interface and viewing application can be displayed in conjunction with a (web) browser and/or hosted application associated with notification and network access control 104, and/or can be displayed in conjunction with an application, stored in a memory of the client device, that is associated with notification and network access control 104.

In the illustrated example, a user interface is presented on display 204, by a notification message client application 206, for generating notification-related information and access control criteria for communication to and use by access point 102. Likewise, a user interface is presented on display 208, by a notification message client application 210, for presenting a notification message and associated compliance condition (as required) to a target client device 106. An example of such a notification message is described more fully below in conjunction with FIG. 3.

In the illustrated example, the notification message client application 206 generates (e.g., based on input by a network administrator) one or more of notification information, target criteria, exception information, compliance information, and resources access level information. The notification information indicates a required user action for network access compliance, and is included in a notification message for presentation on one or more target client devices. In an example, the notification information includes a notification to "update software xyz at: www.xyzsoftware.com". The target client devices for this notification include all current and prospective client devices. The exception information indicates that the client device (or MAC address of the client device) of the network administrator is to be exempted from receiving the notification message and any compliance conditions associated with the notification message (i.e., the client device has already been updated). In this example, the resource access level information specifies that all network resource access is restricted for client devices that are not in compliance with an associated compliance condition.

In certain embodiments, compliance conditions and resource access level information can be specified in multiple tiers for different groupings or types of client devices 106, or based on a type of requested access. For example, client devices which have previously been granted access to a relevant network may be granted partial network resource access privileges, while new client devices with no history on the network may be fully restricted until a compliance condition is satisfied. Access privileges may be controlled, for example, through key management, by disabling communications with a specified network or network interface, by disabling an access point password utilized by a target device to access network resources, etc.

Figure 3:
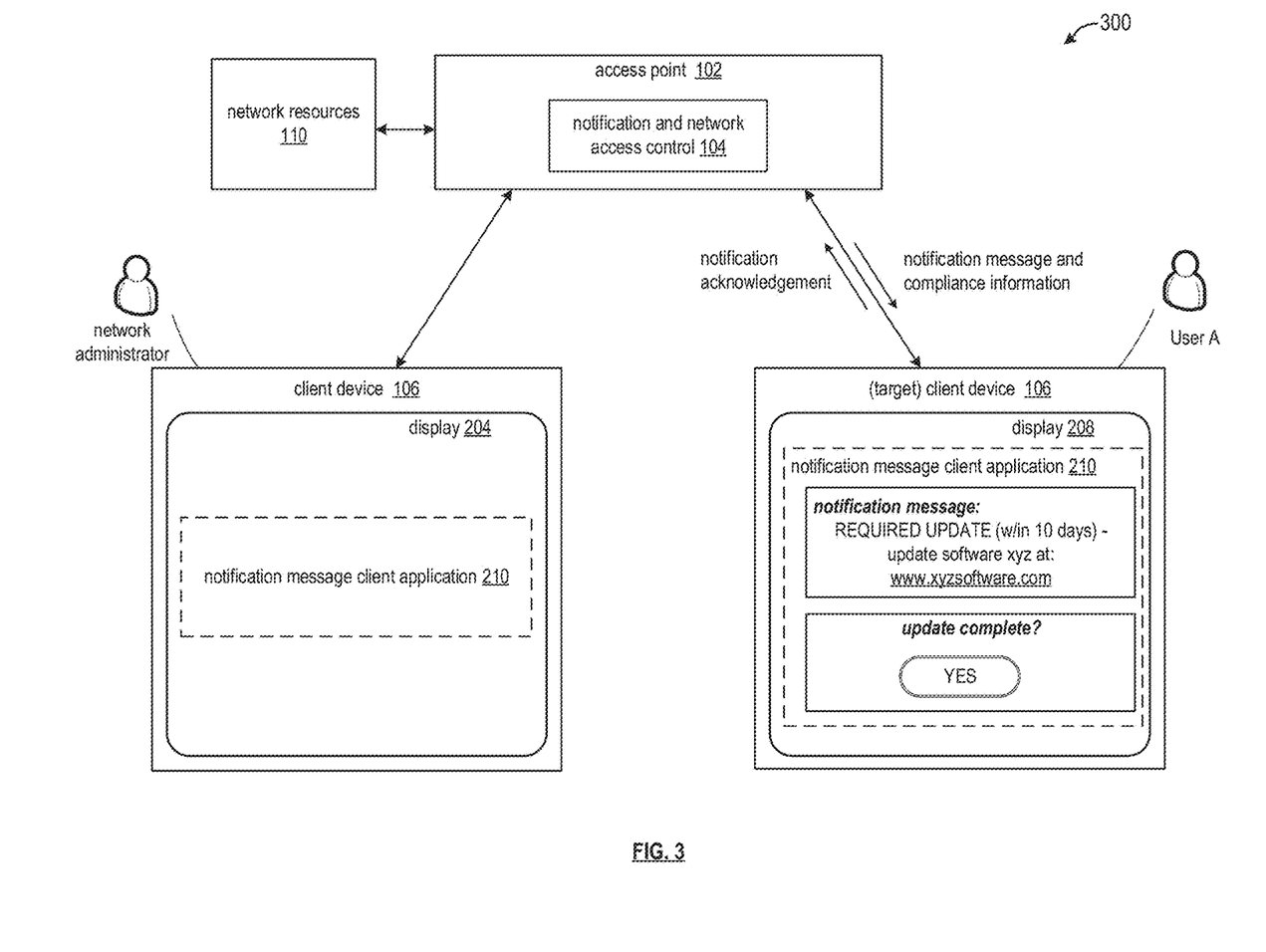
FIG. 3 is a schematic block diagram of an example of transmitting a notification message in accordance with an embodiment of the present disclosure.

FIG. 3 is a schematic block diagram of an example 300 of transmitting a notification message in accordance with an embodiment of the present disclosure. In the illustrated example, the access point 102 communicates a notification message (such as generated in the example of FIG. 2) to a target client device associated with User A. The notification message is presented on display 208 by a notification message client application 210. The example notification message indicates the compliance condition of a required software update, to be completed within ten days of receipt of the notification message (the compliance grace period), for software "xyz". In this instance, the associated compliance condition includes a simple acknowledgement from a user of the target client device 106 that the software update has been completed. Until the compliance condition is met, the notification message may be repeated on a periodic/daily basis, based on a triggering event (e.g., each time a target client device attempts to access a specified network resource), or as otherwise specified by a network administrator.

Figure 4:
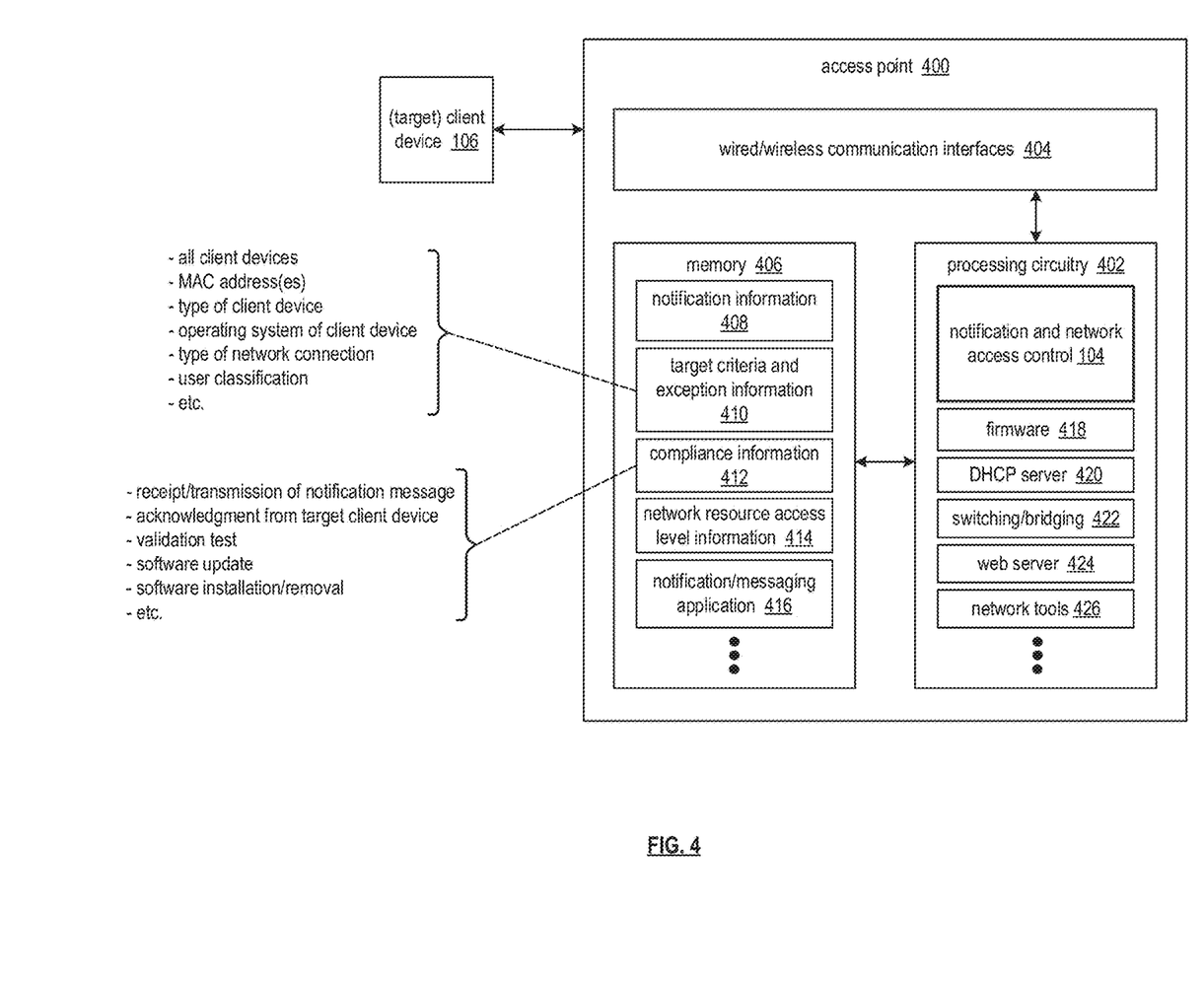
FIG. 4 is a schematic block diagram of an example of an access point in accordance with an embodiment of the present disclosure.

FIG. 4 is a schematic block diagram of an example of an access point 400 in accordance with an embodiment of the present disclosure. The illustrated access point 400 includes processing circuitry 402, one or more wired/wireless communication interfaces 404, and memory 406. The one or more wired/wireless communication interfaces 404 enable communication with (target) client device(s) 106 and network(s) 108.

The processing circuitry 402 of this example is configured to perform notification and network access control 104 and other functions of the access point 400. Notification and network access control 104 may operate, for example, in conjunction with one or more of firmware 418, a DHCP server 420, switching/bridging capabilities 422, web server capabilities 424, network tools 426, and other elements of memory 406 and access point 400 to implement the novel methodologies described herein.

Memory 406 of the illustrated example stores information, including information received from a network administrator or other authorized entity, for use in enabling operations of the notification and network access control 104 and instructing other components of access point 400. For example, memory 406 includes notification information 408, target criteria and exception information 410, compliance information 412, network resource access level information 414, and programming instructions for a notification/messaging application 416 executed by processing circuitry 402. Notification information 408 may include message content, received from or otherwise identified/selected by a network administrator or agent thereof, that generally indicates a user action that is required for network access compliance. In certain embodiments, for example, the notification information 408 may indicate affirmative acts or steps that are required to be performed via or on a target client device. In other examples, the notification information 408 can include network-related information/updates communicated to a target device via notification messaging.

Target criteria and exception information 410 may specify, for example and without limitation, that all client devices 106 are target client devices 106 for purposes of receiving an associated notification message. Alternatively, target client devices 106 may be identified based on one or more of: a MAC address; a type of client device; an operating system of a client device; a type of network connection utilized by a client device; a user classification of a user of a client device; a prior association with the access point; etc. Compliance information 412 for determining network resource access may include, for example and without limitation, one or more of: receipt or transmission of a notification message (e.g., no acknowledgement required); acknowledgement from a target client device; a validation test; a (confirmed) software update or patch; software installation or removal; etc.

Figure 5:
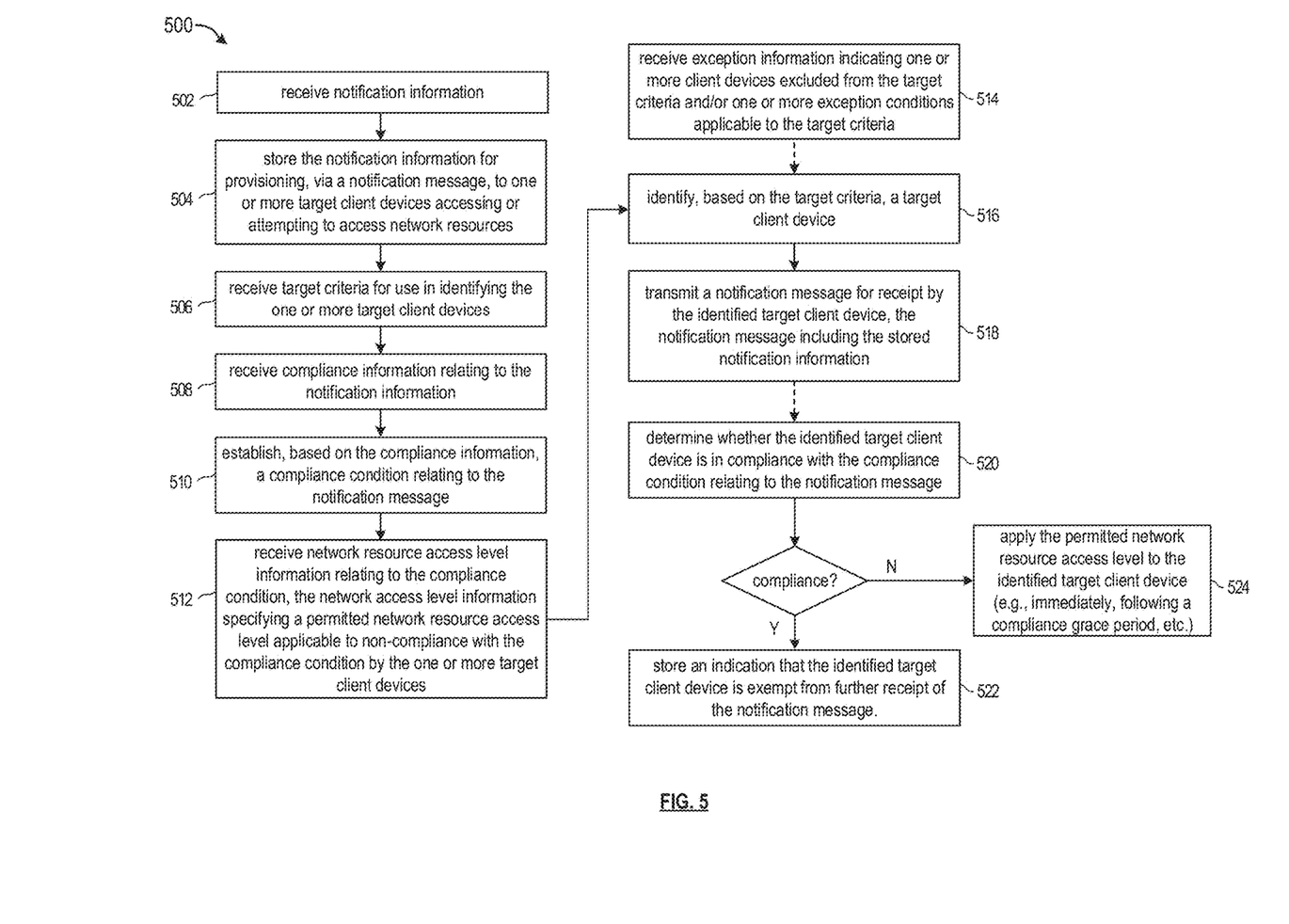
FIG. 5 is a flow diagram illustrating an example of providing notification messages to client devices of a network in accordance with an embodiment of the present disclosure.

FIG. 5 is a flow diagram illustrating an example 500 of providing notification messages to client devices of a network. In particular, a method is presented for use in association with one or more functions and features described in conjunction with FIGS. 1-4. Although the method is described as being executed by an access point that includes memory and one or more processors, it should be appreciated that the method can be executed by another networking device and/or system of a network that includes one or more processors and memory that stores instructions that configure the processor or processors to perform the steps described below.

Step 502 includes an access point 102 receiving notification information (e.g., via a communication link of a client device utilized by a network administrator). Next, in step 504, the notification information is stored by the access point 102 for provisioning, via a notification message, to one or more target client devices 106 accessing or attempting to access network resources associated with the access point. At step 506 the access point 102 further receives and stores target criteria for use in identifying the one or more target client devices 106. Step 508 includes receiving, by the access point 102, compliance information related to the notification information. Based on the compliance information, the access point 102 (e.g., notification and access control functionality of the access point 102) establishes a compliance condition relating to the notification message at step 510.

At step 512, the access point 102 further receives network resource access level information relating to the compliance condition, the network access level information specifying a permitted network access level to be applied to one or more target client devices 106 that are determined not to be in compliance with the compliance condition. In the illustrated method, at step 514 the access point 102 optionally receives and stores exception information. The exception information provides an indication of, for example, one or more client devices 106 excluded from the target criteria, or one or more exception conditions applicable to the target criteria.

Based on the target criteria received at step 506, the access point 102 (at step 516) identifies one or more target client devices 106. In various embodiments according to the invention, target client devices 106 may include devices currently connected to network resources via the access point 102, or new/prospective client devices attempting to access such resources. Next, at step 518, the access point 102 transmits a notification message, including the stored notification information, for receipt by an identified target client device 106.

In further examples, the access point 102 (at step 520) also determines whether the identified target client device is in compliance a compliance condition related to the notification message. Such a determination may be based on receiving an acknowledgement of receipt of the notification message by the target client device 106, determining that the target client device 106 has not performed an action required by the compliance condition, etc. When determining that the identified target client device 106 is compliant with the compliance condition, the access point 102, at step 522, stores an indication that the device is exempt from further receipt of the notification message (and any related network resource access restrictions). If the identified target client device is not in compliance, the access point (at step 524) applies a permitted network resource access level to the device. The permitted network resource access level may restrict access to some or all network resources, and may be applied immediately, following a compliance grace period, etc.

The embodiments of the present invention described above disclose a computer-implemented method, a system/access point, and a computer program product for gating access to network resources pending delivery of stored notification information and fulfilment of compliance criteria. Notification information is received and stored for provisioning, via a notification message, to one or more target client devices accessing or attempting to access network resources. Target criteria is also received for use in identifying target client devices that are accessing or attempting to access network resources. In some embodiments, access to network resources by a targeted client device is constrained pending completion of a compliance condition requirement associated with a notification message. Various levels of access to network resources may be applied to non-compliant target client devices. Following completion of compliance condition, a target client device is exempted from further receipt of the notification message. Certain client devices otherwise meeting the target criteria may also be excluded from receiving a notification message.

Figure 6:
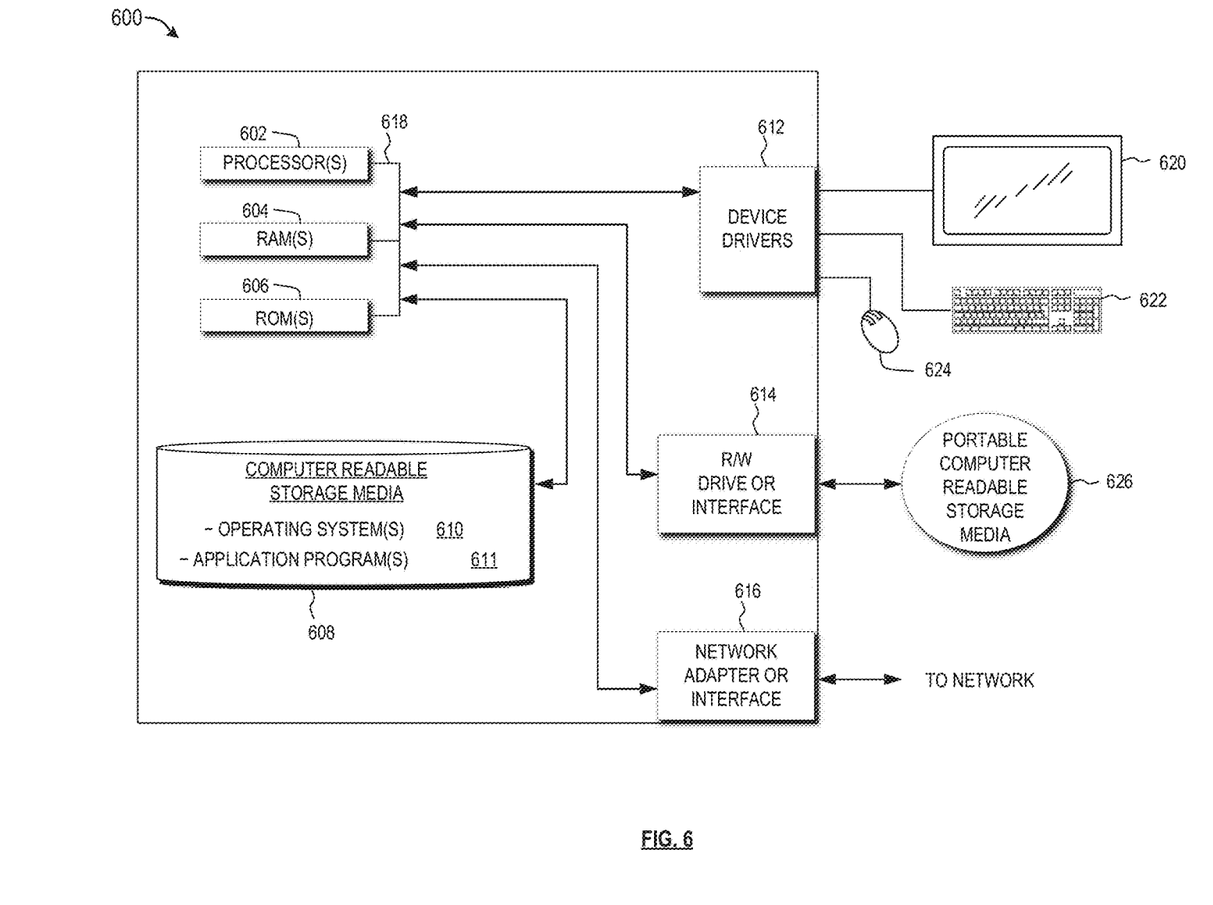
FIG. 6 depicts a block diagram of a computing device according to various embodiments of the present disclosure.
Figure 7:
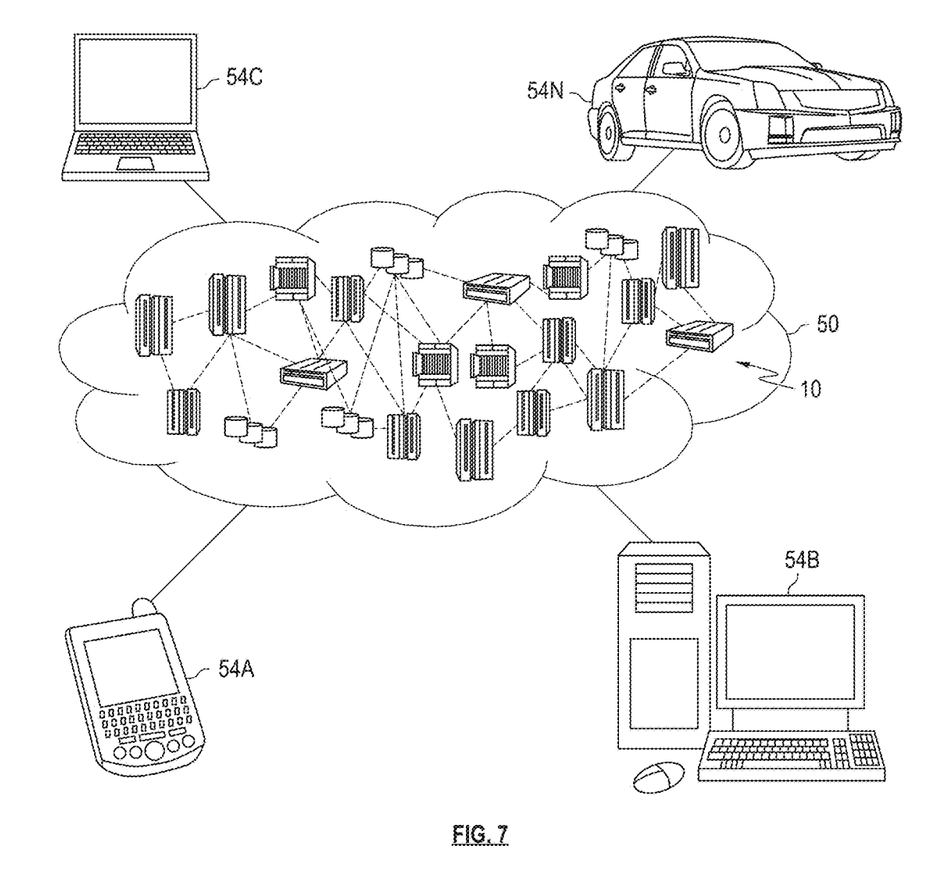
FIG. 7 depicts a cloud computing environment according to various embodiments of the present disclosure.

FIG. 6 depicts a block diagram of components of a computing device 600, which can be utilized to implement some or all of the cloud computing nodes 10, some or all of the computing devices 54A-N of FIG. 7, and/or to implement other computing devices/servers/client devices described herein in accordance with an embodiment of the present invention. It should be appreciated that FIG. 6 provides only an illustration of one implementation and does not imply any limitations with regards to the environments in which different embodiments may be implemented. Many modifications to the depicted environment may be made.

Computing device 600 can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610 and/or application programs 611, such as network application server software 67 and database software 68, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 600 can also include a R/W drive or interface 614 to read from and write to one or more portable computer readable storage media 626. Application programs 611 on computing devices 600 can be stored on one or more of the portable computer readable storage media 626, read via the respective R/W drive or interface 614 and loaded into the respective computer readable storage media 608.

Computing device 600 can also include a network adapter or interface 616, such as a TCP/IP adapter card or wireless communication adapter. Application programs 611 on computing devices 54A-N can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computing device 600 can also include (or otherwise be associated with) a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

FIG. 7 presents an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
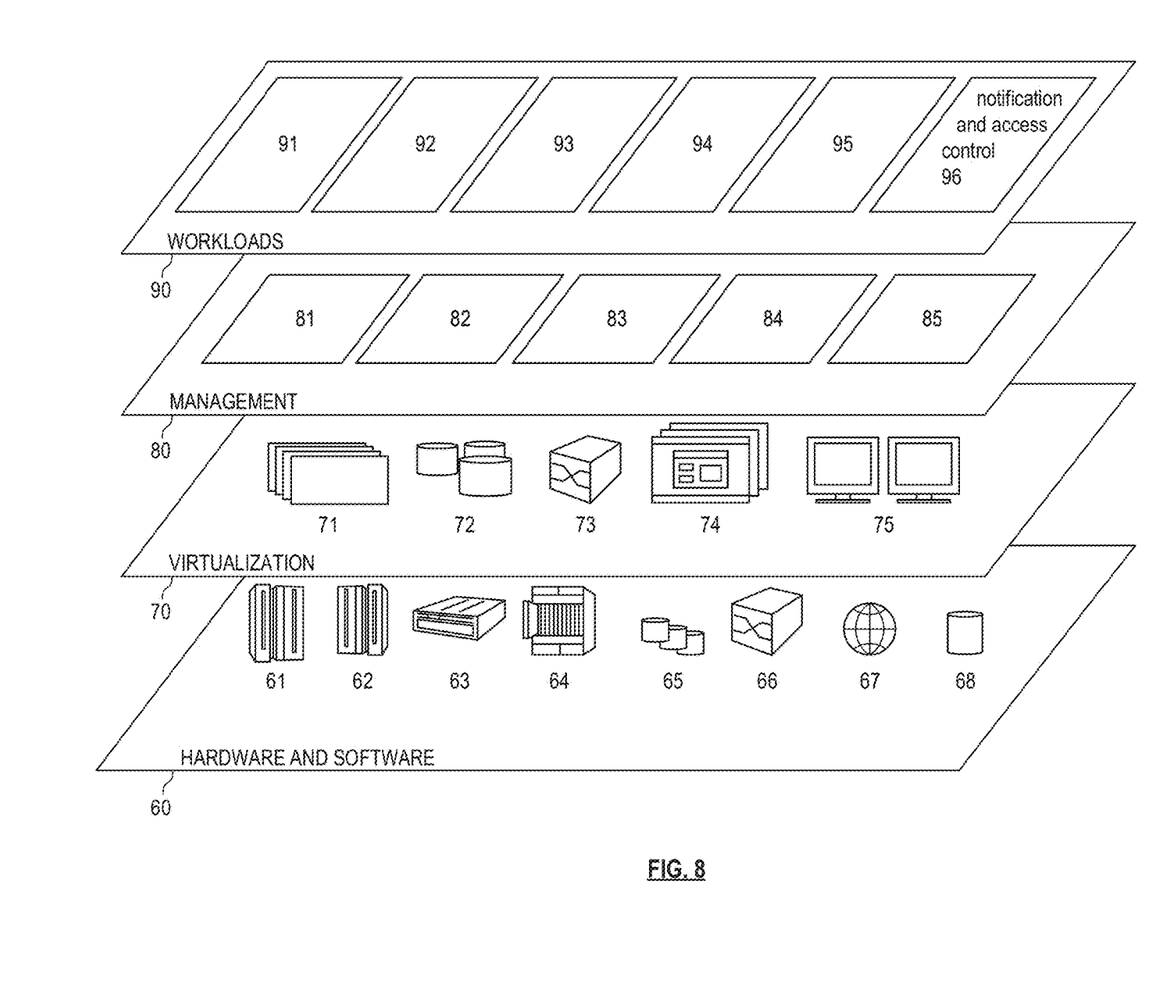
FIG. 8 depicts abstraction model layers according to various embodiments of the present disclosure.

Referring now to FIG. 8, a set of functional abstraction layers provided by cloud computing environment 50 of FIG. 7 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, one or more hardware components can be implemented by utilizing the computing device 600 of FIG. 6.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notification and access control 96, such as described above.

In various embodiments described above, portions of streaming video content which are of likely interest to a recipient are prioritized for display before a current portion. A client device request is received for available streaming video content for presentation on a display associated with the client device. A plurality of media content tags associated with the streaming video content are determined, the plurality of media content tags including a first media content tag associated with a stored portion of the streaming video content and a second media content tag associated with a current portion of the streaming video content. A cognitive profile associated with a user of the client device is retrieved from a database. Based on the first media content tag and the cognitive profile, a first interest correlation value is calculated (additional such interest correlation values may also be calculated). In addition, based on the second media content tag and the cognitive profile, a second interest correlation value is calculated. When the first interest correlation value indicates a greater interest level than the second interest correlation value, display of the stored portion of the streaming video content on the display device is prioritized over the display of the current portion of the streaming video content. Display of a current portion may subsequently be prioritized based on an updated interest correlation value.

As may be used herein, the term "substantially" provides an industry-accepted tolerance for its corresponding term and/or relativity between items. Such an industry-accepted tolerance ranges from less than one percent to fifty percent. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagrams, can be implemented by special purpose hardware-based systems that perform the specified functions or acts or carry out combinations of special purpose hardware and computer instructions.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be one or more tangible devices that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of an access point of a network, the method comprises:
    receiving notification information indicating a required user action for network access compliance;
    storing the notification information for provisioning, via a notification message, to one or more target client devices accessing or attempting to access network resources via the access point; receiving target criteria for use in identifying the one or more target client devices; receiving compliance information relating to the notification information; establishing, based on the compliance information, a compliance condition relating to the notification message;
    receiving network resource access level information relating to the compliance condition, the network resource access level information specifying a permitted network resource access level applicable to non-compliance with the compliance condition by the one or more target client devices;
    identifying, based on the target criteria, a target client device; and
    transmitting the notification message for receipt by the identified target client device, the notification message including the stored notification information.

2. The method of claim 1 further comprises:
    determining whether the identified target client device is in compliance with the compliance condition; and
    when determining that the identified target client device is not in compliance with the compliance condition, applying the permitted network resource access level to the identified target client device.

3. The method of claim 2 further comprises:
    when determining that the identified target client device is in compliance with the compliance condition, storing an indication that the identified target client device is exempt from further receipt of the notification message.

4. The method of claim 2 further comprises:
    determining that the identified target client device is presently accessing network resources via the access point; and
    wherein applying the permitted network resource access level to the identified target client device occurs following a compliance grace period indicated by the network resource access level information.

5. The method of claim 2, wherein applying the permitted network resource access level to the identified target client device includes disabling an access point password utilized by the identified target device to access network resources.

6. The method of claim 1 further comprises:
    receiving exception information, the exception information indicating one or more client devices excluded from the target criteria.

7. The method of claim 1 further comprises:
    receiving exception information, the exception information indicating one or more exception conditions applicable to the target criteria.

8. The method of claim 1, wherein the compliance condition includes at least one of: receipt of the notification message by a target client device;
    receiving an acknowledgement of the notification message from the target client device; performance of a validation test by the target client device; installation of specified software on the target client device; or removal of specified software from the target client device.

9. The method of claim 1, wherein the target criteria include at least one of: all client devices;
    a media access control address of one or more client devices; a type of client device; an operating system; a type of network connection; or
    a class of user identified by authentication information received from a client device.

10. A computer program product comprising a non-transitory computer readable storage medium having program instructions embodied therewith, the program instructions executable by one or more processing modules of an access point to cause the one or more processing modules to:
    receive notification information indicating a required user action for network access compliance;
    store the notification information for provisioning, via a notification message, to one or more target client devices accessing or attempting to access network resources via the access point;
    receive target criteria for use in identifying the one or more target client devices;
    receive compliance information relating to the notification information;
    establish, based on the compliance information, a compliance condition relating to the notification message;
    receive network resource access level information relating to the compliance condition, the network resource access level information specifying a permitted network resource access level applicable to non-compliance with the compliance condition by the one or more target client devices;
    identify, based on the target criteria, a target client device; and
    transmit the notification message for receipt by the identified target client device, the notification message including the stored notification information.

11. The computer program product of claim 10, the program instructions further executable to cause the one or more processing modules to:
    determine whether the identified target client device is in compliance with the compliance condition; and
    when determining that the identified target client device is not in compliance with the compliance condition, apply the permitted network resource access level to the identified target client device.

12. The computer program product of claim 11, the program instructions further executable to cause the one or more processing modules to:
    when determining that the identified target client device is in compliance with the compliance condition, store an indication that the identified target client device is exempt from further receipt of the notification message.

13. The computer program product of claim 11, the program instructions further executable to cause the one or more processing modules to:
    determine that the identified target client device is presently accessing network resources via the access point; and
    wherein applying the permitted network resource access level to the identified target client device occurs following a compliance grace period indicated by the network resource access level information.

14. The computer program product of claim 10, the program instructions further executable to cause the one or more processing modules to:
    receive exception information indicating at least one of:
        one or more client devices excluded from the target criteria; or one or more exception conditions applicable to the target criteria.

15. The computer program product of claim 10, wherein the compliance condition includes at least one of:
    receipt of the notification message by a target client device;
    receiving an acknowledgement of the notification message from the target client device; performance of a validation test by the target client device; installation of specified software on the target client device; or removal of specified software from the target client device.

16. An access point comprises: one or more network interfaces;
    a memory comprising instructions; and
    processing circuitry in communication with the memory, wherein the processing circuitry executes the instructions to:
    receive, via the one or more network interfaces, notification information indicating a required user action for network access compliance;
    store the notification information for provisioning, via a notification message, to one or more target client devices accessing or attempting to access network resources via the access point;
    receive, via the one or more network interfaces, target criteria for use in identifying the one or more target client devices;
    receive, via the one or more network interfaces, compliance information relating to the notification information;
    establish, based on the compliance information, a compliance condition relating to the notification message;
    receive, via the one or more network interfaces, network resource access level information relating to the compliance condition, the network resource access level information specifying a permitted network resource access level applicable to non-compliance with the compliance condition by the one or more target client devices; identify, based on the target criteria, a target client device; and transmit, via the one or more network interfaces, the notification message for receipt by the identified target client device, the notification message including the stored notification information.

17. The access point of claim 16, wherein the processing circuitry further executes the instructions to:
    determine whether the identified target client device is in compliance with the compliance condition; and
    when determining that the identified target client device is not in compliance with the compliance condition, apply the permitted network resource access level to the identified target client device.

18. The access point of claim 17, wherein the processing circuitry further executes the instructions to:
    when determining that the identified target client device is in compliance with the compliance condition, store an indication that the identified target client device is exempt from further receipt of the notification message.

19. The access point of claim 17, wherein the processing circuitry further executes the instructions to:
    determine that the identified target client device is presently accessing network resources via the access point; and
    wherein applying the permitted network resource access level to the identified target client device occurs following a compliance grace period indicated by the network resource access level information.

20. The access point of claim 16, wherein the processing circuitry further executes the instructions to:
    receive, via the one or more network interfaces, exception information indicating at least one of:
    one or more client devices excluded from the target criteria; or one or more exception conditions applicable to the target criteria.

* * * * *